(12) United States Patent
Parkinson et al.

(10) Patent No.: US 11,016,883 B2
(45) Date of Patent: May 25, 2021

(54) SAFE MANUAL MEMORY MANAGEMENT

(71) Applicant: Microsoft Technology Licensing, LLC, Redmond, WA (US)

(72) Inventors: Matthew John Parkinson, Cambridge (GB); Manuel Silverio da Silva Costa, Cambridge (GB); Dimitrios Vytiniotis, Cambridge (GB); Kapil Vaswani, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 569 days.

(21) Appl. No.: 15/615,757

(22) Filed: Jun. 6, 2017

(65) Prior Publication Data
US 2018/0253311 A1    Sep. 6, 2018

(51) Int. Cl.
*G06F 12/00* (2006.01)
*G06F 12/02* (2006.01)

(52) U.S. Cl.
CPC ...... *G06F 12/0269* (2013.01); *G06F 12/0253* (2013.01)

(58) Field of Classification Search
CPC .... G06F 9/30123; G06F 9/30116; G06F 9/44; G06F 12/0253; G06F 12/0269
See application file for complete search history.

(56) References Cited

U.S. PATENT DOCUMENTS

| 8,028,133 | B2 | 9/2011 | Dice et al. | |
| 9,003,162 | B2 | 4/2015 | Lomet et al. | |
| 2007/0288708 | A1* | 12/2007 | Saha | G06F 9/30032 |
| | | | | 711/159 |
| 2016/0292072 | A1* | 10/2016 | Edwards | G06F 12/0261 |
| 2017/0344473 | A1* | 11/2017 | Gidra | G06F 12/0261 |

OTHER PUBLICATIONS

Turon, Aaron, "Lock-freedom without garbage collection", https://aturon.github.io/blog/2015/08/27/epoch/, Published on: Aug. 27, 2015, 18 pages.
"Lock-free Data Structures. The Inside. Memory Management Schemes", http://kukuruku.co/hub/cpp/lock-free-data-structures-the-inside-memory-management-schemes, Published on: Jun. 1, 2014, 19 pages.

(Continued)

*Primary Examiner* — Alexander Khong

(57) ABSTRACT

A method of manual memory management is described which comprises enabling one or more threads to access an object created in a manual heap by storing a reference to the object in thread-local state and subsequently deleting the stored reference after accessing the object. In response to abandonment of the object, an identifier for the object and a current value of either a local counter of a thread or a global counter are stored in a delete queue and all threads are prevented from storing any further references to the object in thread-local state. Deallocation of the object only occurs when all references to the object stored in thread-local state for any threads have been deleted and a current value of the local counter for the thread or the global counter has incremented to a value that is at least a pre-defined amount more than the stored value, wherein the global counter is updated using one or more local counters.

20 Claims, 12 Drawing Sheets

(56) References Cited

OTHER PUBLICATIONS

"Epoch Reclamation", http://web.archive.org/web/20160424041436/http://concurrencykit.org/presentations/ebr.pdf, Published on: Apr. 24, 2016, 18 pages.
Brown, Trevor, "Reclaiming Memory for Lock-Free Data Structures: There has to be a Better Way", In Proceedings of ACM Symposium on Principles of Distributed Computing, Jul. 21, 2015, 10 pages.
Dice, et al., "Fast Non-intrusive Memory Reclamation for Highly-Concurrent Data Structures", In Proceedings of ACM SIGPLAN International Symposium on Memory Management, Jun. 14, 2016, pp. 36-45.
Michael, Maged M., "Safe Memory Reclamation for Dynamic Lock-Free Objects Using Atomic Reads and Writes", In Proceedings of Twenty-First ACM Symposium on Principles of Distributed Computing, Jul. 21, 2002, pp. 1-10.
Braginsky, et al., "Drop the Anchor: Lightweight Memory Management for Non-Blocking Data Structures", In Proceedings of 25th ACM Symposium on Parallelism in Algorithms and Architectures, Jul. 23, 2013, 10 pages.
Alistarh, et al., "ThreadScan: Automatic and Scalable Memory Reclamation", In Proceedings of 27th ACM Symposium on Parallelism in Algorithms and Architectures, Jun. 13, 2015, 10 pages.
Gidenstam, et al., "Practical and Efficient Lock-Free Garbage Collection Based on Reference Counting", In Technical Report of Goteborg University, Mar. 2005, pp. 1-16.
Gotsman, et al., "Verifying Concurrent Memory Reclamation Algorithms with Grace", In Proceedings of 22nd European Conference on Programming Languages and Systems, Mar. 16, 2013, 52 pages.
Hendler, et al., "A Scalable Lock-free Stack Algorithm", In Proceedings of Sixteenth Annual ACM Symposium on Parallelism in Algorithms and Architectures, Jun. 27, 2004, pp. 206-215.
Luo, John, "Libraries for in-memory caching and distributed caching", https://github.com/aspnet/Caching, Retrieved on: Jan. 19, 2017, 2 pages.
"Asynchronous Programming with async and await (C#)", https://msdn.microsoft.com/en-us/library/mt674882.aspx, Published on: Jul. 20, 2015, 11 pages.
".NET Core Common Language Runtime (CoreCLR)", https://github.com/dotnet/CoreCLR, Retrieved on: Jan. 19, 2017, 6 pages.
"Electric Fence", http://elinux.org/Electric_Fence, Published on: Jan. 31, 2015, 2 pages.
"How to use the PageHeap utility to detect memory errors in a Microsoft Visual C++ project", https://support.microsoft.com/en-us/help/264471/how-to-use-the-pageheap-utility-to-detect-memory-errors-in-a-microsoft-visual-c-project, Published on: Sep. 20, 2012, 4 pages.
"Jemalloc—Memory Allocator", http://jemalloc.net/, Retrieved on: Jan. 19, 2017, 2 pages.
"Module crossbeam::mem::epoch", http://aturon.github.io/crossbeam-doc/crossbeam/mem/epoch/index.html, Retrieved on: Jan. 19, 2017, 4 pages.
"Rust Programming Language", https://www.rust-lang.org/en-US/, Published on: Dec. 22, 2016, 2 pages.
"Type-safe off-heap memory for Scala", https://github.com/densh/scala-offheap, Retrieved on: Jan. 19, 2017, 2 pages.
"Tpch", http://www.tpch.org/tpch, Retrieved on: Jan. 19, 2017, 1 pages.
Akritidis, Periklis, "Cling: A memory allocator to mitigate dangling pointers", In Proceedings of the 19th USENIX conference on Security, Aug. 11, 2010, 16 pages.
Bacon, et al., "Java without the coffee breaks: A nonintrusive multiprocessor garbage collector", In Proceedings of the ACM SIGPLAN conference on Programming language design and implementation, Jun. 20, 2001, 12 pages.
Bacon, et al., "The Metronome: A Simpler Approach to Garbage Collection in Real-Time Systems", In Workshop on Java Technologies for Real-Time and Embedded Systems, Nov. 5, 2003, 20 pages.
Baker, Henry G., ""Use-Once" Variables and Linear Objects-Storage Management, Reflection, and Multi-Threading", In Journal of ACM SIGPLAN Notices, vol. 30, Issue 1, Jan. 1995, pp. 45-52.
Berger, et al., "Diehard: Probabilistic Memory Safety for Unsafe Languages", In Proceedings of 27th ACM SIGPLAN Conference on Programming Language Design and Implementation, Jun. 11, 2006, pp. 158-168.
Blackburn, et al., "Immix: A Mark-Region Garbage Collector with Space Efficiency, Fast Collection, and Mutator Performance", In Proceedings of 29th ACM SIGPLAN Conference on Programming Language Design and Implementation, Jun. 7, 2008, pp. 22-32.
Bloom, Burton H., "Space/Time Trade-Offs in Hash Coding with Allowable Errors", In Journal of Communications of the ACM, vol. 13, No. 7, Jul. 1970, pp. 422-426.
Boehm, et al., "Garbage Collection in an Uncooperative Environment", In Journal of Software—Practice and Experience, vol. 18, Issue 9, Sep. 1988, pp. 1-17.
Boyapati, et al., "Ownership Types for Safe Region-based Memory Management in Real-Time Java", In Proceedings of ACM SIGPLAN Conference on Programming Language Design and Implementation, Jun. 9, 2003, pp. 324-337.
Boyland, John, "Alias Burying: Unique Variables without Destructive Reads", In Journal of Software—Practice and Experience, vol. 31, Issue 6, May 2001, pp. 1-21.
Clarke, et al., "External Uniqueness is Unique Enough", In Proceedings of European Conference on Object-Oriented Programming, Jul. 2003, 25 pages.
Clarke, et al., "Ownership Types for Flexible Alias Protection", In Proceedings of 13th ACM SIGPLAN Conference on Object-Oriented Programming, Systems, Languages, and Applications, Oct. 18, 1998, pp. 48-64.
Degenbaev, et al., "Idle Time Garbage Collection Scheduling", In Proceedings of 37th ACM SIGPLAN Conference on Programming Language Design and Implementation, Jun. 13, 2016, pp. 570-583.
Dhurjati, et al., "Efficiently Detecting All Dangling Pointer Uses in Production Servers", In Proceedings of International Conference on Dependable Systems and Networks, Jun. 25, 2006, 10 pages.
Dhurjati, et al., "Memory safety without runtime checks or garbage collection", In Proceedings of the ACM SIGPLAN conference on Language, compiler, and tool support for embedded systems, vol. 38, Issue 7, Jun. 11, 2003, pp. 69-80.
Fraser, Keir, "Practical lock-freedom", In PhD Thesis UCAM-CL-TR-579, University of Cambridge, Feb. 2004, 116 pages.
Gidra, et al., "NumaGiC: a garbage collector for big data on big NUMA machines", In Proceedings of the Twentieth International Conference on Architectural Support for Programming Languages and Operating Systems, Mar. 14, 2015, pp. 661-673.
Gog, et al., "Broom: sweeping out garbage collection from big data systems", In Proceedings of the 15th USENIX conference on Hot Topics in Operating Systems, May 18, 2015, 7 pages.
Grossman, et al., "Region-based memory management in cyclone", In Proceedings of the ACM SIGPLAN conference on Programming language design and implementation, Jun. 17, 2002, pp. 282-293.
Hart, et al., "Performance of memory reclamation for lockless synchronization", In Journal of Parallel and Distributed Computing, vol. 37, Issue 12, May 2007, pp. 1270-1285.
Hertz, et al., "Quantifying the Performance of Garbage Collection vs. Explicit Memory Management", In Proceedings of the 20th Annual ACM SIGPLAN Conference on Object-Oriented Programming, Systems, Languages, and Applications,, Oct. 16, 2005, 14 pages.
Hicks, et al., "Experience with safe manual memory-management in Cyclone", In Proceedings of the 4th international symposium on Memory management, Oct. 24, 2004, pp. 73-84.
Hogg, John, "Islands: Aliasing protection in object-oriented languages", In Conference proceedings on Object-oriented programming systems, languages, and applications, Oct. 6, 1991, pp. 271-285.
Hundt, Robert, "Loop recognition in C++/Java/Go/Scala", In Proceedings of Scala Days, 2011, 10 pages.
Jones, et al., "The Garbage Collection Handbook: The Art of Automatic Memory Management", In Publication of Chapman & Hall/ CRC, 1st edition, 2011, 16 pages.

(56) References Cited

OTHER PUBLICATIONS

Lee, et al., "Preventing use-after-free with dangling pointer nullification", In Proceedings of 22nd Annual Network and Distributed System Security Symposium,, Feb. 8, 2015, pp. 1-15.

Lvin, et al., "Archipelago: trading address space for reliability and security", In Proceedings of the 13th international conference on Architectural support for programming languages and operating systems, Mar. 1, 2008, pp. 115-124.

Maas, et al., "Taurus: A holistic language runtime system for coordinating distributed managed-language applications", In Proceedings of the Twenty-First International Conference on Architectural Support for Programming Languages and Operating Systems, Apr. 2, 2016, pp. 457-471.

Michael, Maged M., "Hazard pointers: Safe memory reclamation for lock-free objects", In Proceedings of IEEE Transactions on Parallel and Distributed Systems, vol. 15, No. 6, Jun. 2004, pp. 491-504.

Minka, et al., "Infer.NET", http://infernet.azurewebsites.net/default.aspx, Published on: Nov. 25, 2014, 1 page.

Minsky, Naftaly H., "Towards alias-free pointers", In Proceedings of the 10th European Conference on Object-Oriented Programming, Jul. 8, 1996, pp. 189-209.

Naden, et al., "A type system for borrowing permissions", In Proceedings of the 39th annual ACM SIGPLAN-SIGACT symposium on Principles of programming languages, Jan. 25, 2012, pp. 557-570.

Nagarakatte, et al., "CETS: compiler enforced temporal safety for c", In Proceedings of the international symposium on Memory management, Jun. 5, 2010, pp. 31-40.

Nguyen, et al, "Yak: A high-performance big-data-friendly garbage collector", In Proceedings of the 12th USENIX conference on Operating Systems Design and Implementation, Nov. 2, 2016, 17 pages.

Nguyen, et al., "Facade: A compiler and runtime for (almost) object-bounded big data applications", In Proceedings of the Twentieth International Conference on Architectural Support for Programming Languages and Operating Systems, Mar. 14, 2015, pp. 675-690.

Novark, et al., "DieHarder: Securing the Heap", In Proceedings of the 17th ACM conference on Computer and communications security, Oct. 4, 2010, pp. 1-11.

Smith, et al., "Alias types", In Journal of European Symposium on Programming, May 12, 2000, pp. 366-381.

Stefanovic, et al., "Age-based garbage collection", In Proceedings of the 14th ACM SIGPLAN conference on Object-oriented programming, systems, languages, and applications, Nov. 1, 1999, pp. 370-381.

Swamy, et al., "Safe manual memory-management in Cyclone", In Journal of Science of Computer Programming, vol. 62, Issue 2, Oct. 2006, pp. 122-144.

Tene, et al., "C4: The continuously concurrent compacting collector", In Proceedings of the international symposium on Memory management, Jun. 4, 2011, pp. 79-88.

Tofte, et al., "Region-based memory management", In Journal of Information and Computation, vol. 132, Issue 2, Feb. 1, 1997, pp. 109-176.

Wadler Philip, "Linear types can change the world", In the international federation for information processing, Technical Committees, vol. 2, Apr. 1990, pp. 1-21.

Walker, et al., "Typed memory management in a calculus of capabilities", In Proceedings of the 26th ACM SIGPLAN-SIGACT symposium on Principles of programming languages, Jan. 20, 1999, 14 pages.

Walker, et al., "On regions and linear types", In Proceedings of the sixth ACM SIGPLAN international conference on Functional programming, Sep. 3, 2001, pp. 181-192.

Younan, Yves, "FreeSentry: protecting against user-after-free vulnerabilities due to dangling pointers", In Proceedings of 22nd Annual Network and Distributed System Security Symposium, Feb. 8, 2015, pp. 1-15.

Zorn, Benjamin G., "The measured cost of conservative garbage collection", In Journal Software—Practice & Experience archive vol. 23, Issue 7, Jul. 1993, 37 pages.

\* cited by examiner

SAFE MANUAL MEMORY MANAGEMENT

BACKGROUND

Garbage collection improves programmer productivity because it frees programmers from having to consider object lifetimes and freeing memory and it also prevents temporal memory safety errors, i.e. uses of memory after it has been freed, which may lead to safety breaches. In contrast, manual memory management often delivers better performance, e.g. because a programmer can promptly deallocate objects and exploit their knowledge of object lifetimes to free objects at specific program locations, but is often unsafe and can lead to system crashes or security vulnerabilities because freeing memory may create dangling pointers, i.e. pointers to memory that has been freed, and dereferences of dangling pointers lead to undefined behavior.

The embodiments described below are not limited to implementations which solve any or all of the disadvantages of known methods of memory management.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method of manual memory management is described which comprises enabling one or more threads to access an object created in a manual heap by storing a reference to the object in thread-local state and subsequently deleting the stored reference after accessing the object. In response to abandonment of the object, an identifier for the object and a current value of a local counter of a thread (or a local counters of all of the threads) or a global counter are stored in a delete queue and all threads are prevented from storing any further references to the object in thread-local state (and hence are prevented from accessing the object). Deallocation of the object only occurs when all references to the object stored in thread-local state for any threads have been deleted and when a current value of the local counter for the thread (or the local counters of all of the threads) or a global counter has incremented to a value that is at least a predefined amount more than the stored value, wherein the global counter is updated using one or more local counters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
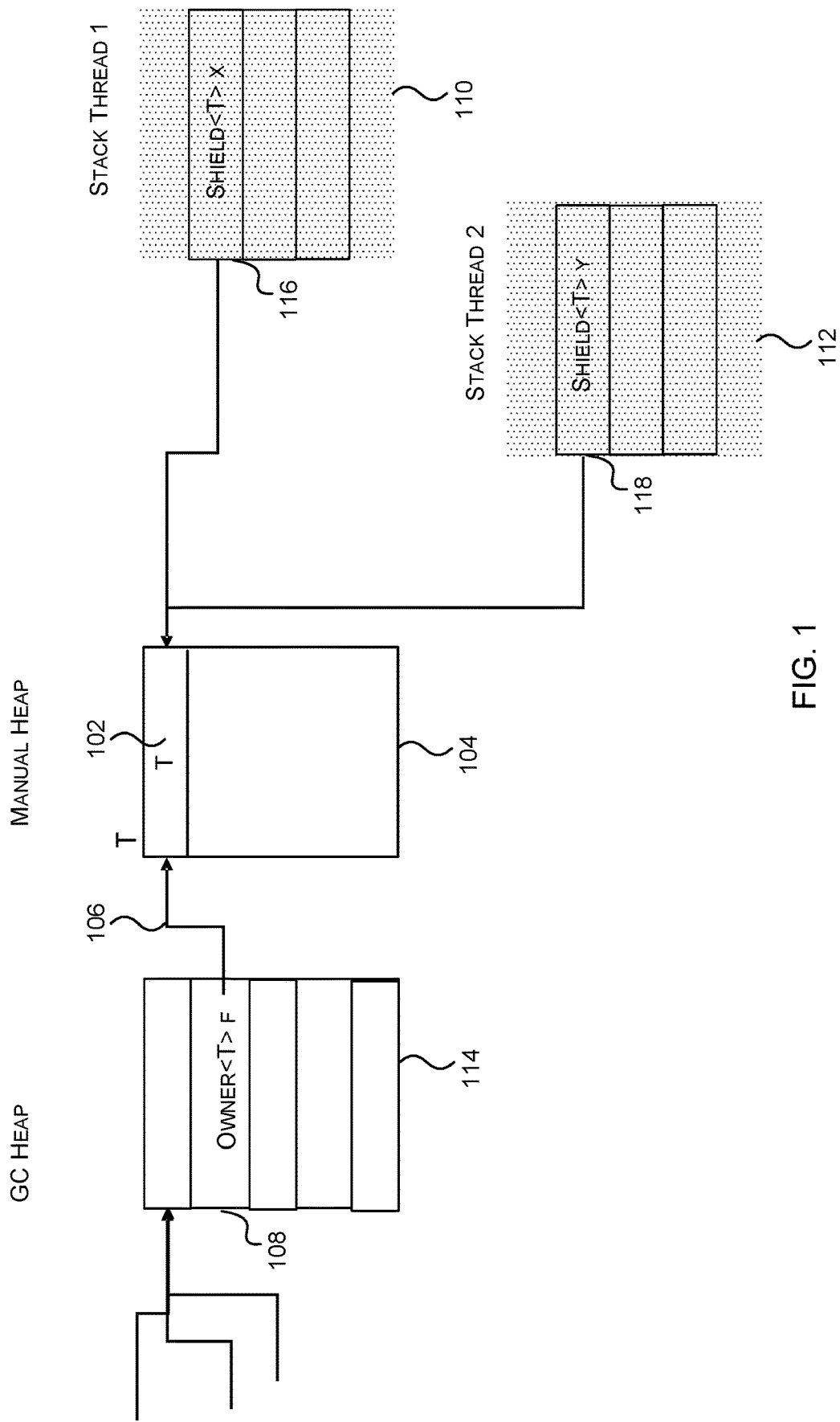
FIG. 1 shows a graphical representation of the use of shields and owners.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, manual memory management typically achieves better throughput and better memory usage than use of garbage collection (GC), but garbage collection ensures memory safety. In particular, where many cores and/or large data sets are used (e.g. for data analysis problems and machine learning), GC can become a bottleneck.

Described herein are methods of safe manual memory management which provide the performance gains of manual memory management as well as ensuring memory safety. As described in more detail below, access to the object is enabled using 'shields'. A shield enables a thread (e.g. one of the threads in a program) to access the object and whilst the object is shielded it cannot be deallocated. If the object is abandoned, the object is scheduled for deallocation but cannot be deallocated if there are any pending shields. In various examples each object in a manual heap has a single owning pointer to it and the shields enable multiple secondary accesses to the object by threads which are not the owner thread.

Each thread (e.g. in the program) has a local counter and there may additionally be a single global counter and at the point of abandonment of an object (e.g. by the owning thread), the current value of a local counter of a thread (e.g. the owning thread's local counter) or the current value of a global counter (where the global counter is updated based on the local counters of the threads), along with an identifier for the object, in a delete queue of the deallocating thread (e.g. in the owning thread's delete queue). In various examples, the current value of the local counters for all of the threads may be stored in the delete queue. Deallocation is performed only when there are no remaining shields (i.e. all those threads that had obtained a shield for the object have accessed the object and disposed of the shield) and when a current value of the local counter of the thread (i.e. the same local counter that had its current value stored in the delete queue), or the global counter has incremented to a value that is at least a pre-defined amount more than the stored value. In the event that values are stored in the delete queue for local counters of all of the threads, deallocation is only performed when there are no remaining shields and when the value of each local counter has advanced by a pre-defined amount (e.g. three) compared to the counter value(s) stored in the delete queue. The methods that control the incrementing of the counters are described below.

By using this combination of shields and counter values (which may alternatively be referred to as 'epochs'), objects in the manual heap are not deallocated until it is safe to do so (i.e. once all the threads that require access to the object have accessed it and at a point when further access to the object is prevented) and the counter values synchronize the different threads' views of the shields, without requiring actual synchronization (e.g. using barriers or fences that reduce the efficiency). The combination of shields and counter values provides both liveness (e.g. because one thread cannot block the progress of other threads) and efficiency (e.g. because the synchronization of threads does not use barriers or fences to access the object.

The methods described herein may be used in combination with garbage collection (e.g. as in the examples described below) or alternatively, the methods may be used separately from garbage collection.

FIG. 1 shows a graphical representation of the use of shields in an example where an object created in the manual heap has a single owner (although ownership can be transferred between threads). As shown in FIG. 1, each object 102 (denoted T in FIG. 1) in the Manual Heap 104 has a single owning pointer 106 to it (i.e. such that no two owners can refer to the same manual object). The owner 108 may live on the stack (e.g. Thread 1 Stack 110 or Thread 2 Stack 112), the GC Heap 114 (as in the example shown in FIG. 1) or the Manual Heap 104 and contains a link to the underlying object. Multiple threads may use this owner 108 to obtain stack-local shields 116, 118, which internally refer to the manual object 102 directly. A shield, Shield<T>, acts as an access token to the underlying object and encapsulates a reference to a thread-local state that records the underlying manual object as one whose memory cannot be reclaimed. Unlike owners, shields cannot be stored on the manual heap 104 or GC heap 114 and this is because shields encapsulate references to thread-local state and storing them on the heap makes them accessible to other threads for which the thread-local state reference is not meaningful.

In the example shown in FIG. 1, the owner 108, Owner<T> is defined as a struct and this has the effect that no GC allocation overhead is incurred. Use of a struct does, however, mean that the Owner<T> can only be passed to functions by reference (otherwise the unique owner condition is violated).

Figure 2:
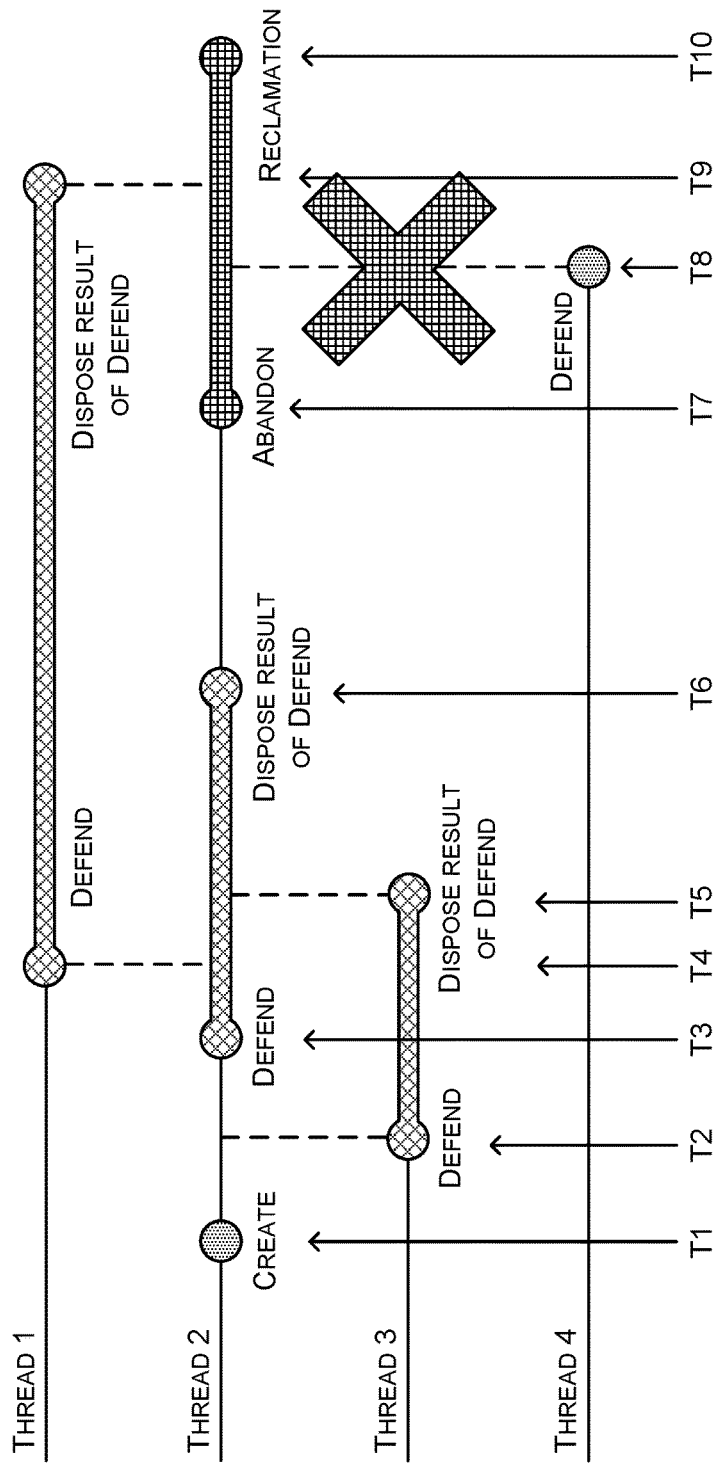
FIG. 2 is a timeline showing the operation of shields.

The operation of shields can be described with reference to FIG. 2 which shows owner and shield lifetimes in a left to right chronological order. The example shown in FIG. 2 shows four threads, labeled 1-4. In the example shown in FIG. 2, Thread 2 creates an owner object (at time T1) and subsequently creates a shield (at time T3 e.g. using a Defend( ) event) that allows it to access the underlying object up to the point of disposal of that shield (at time T6). At the same time Thread 3 can also access the same object by obtaining another shield (at time T2). At some point later on, Thread 2 deletes the object (at time T7 e.g. using an Abandon( ) event), and the object is scheduled for deallocation; however the presence of active shields for the object prevents the object from being deallocated immediately. Thread 3's shield is no longer active as it has already been disposed of (at time T5) but Thread 1 has in the meanwhile also obtained a shield (at time T4), so is keeping the object from being deallocated. Deallocation can proceed only once there are no threads that hold an (undisposed) shield to the underlying object and so deallocation cannot proceed until after Thread 1's shield is disposed of (at time T9). Once the object has been deleted by the owner (Thread 2, at time T7), no more shields can be obtained so Thread 4 cannot obtain a shield (at time T8) as it is issuing the Defend( ) call after Thread 2 has abandoned the owner (at time T7).

Whilst FIG. 2 shows shields as being tied to a specific access of a specific object, in various examples they may be used to defend multiple objects, one after the other. For example, a shield may be re-used for multiple iterations of a loop and in each iteration it may defend a different object. Furthermore, whilst at any time an object has a single owner, the ownership of an object may, in various examples, be transferred from one thread to another (e.g. using an Atomic Exchange instruction, which in a single, indivisible operation, reads the old value and stores a new value in a single location and hence effectively grabs ownership of what was stored in the location and loses ownership of what it put into the location).

Figure 3:
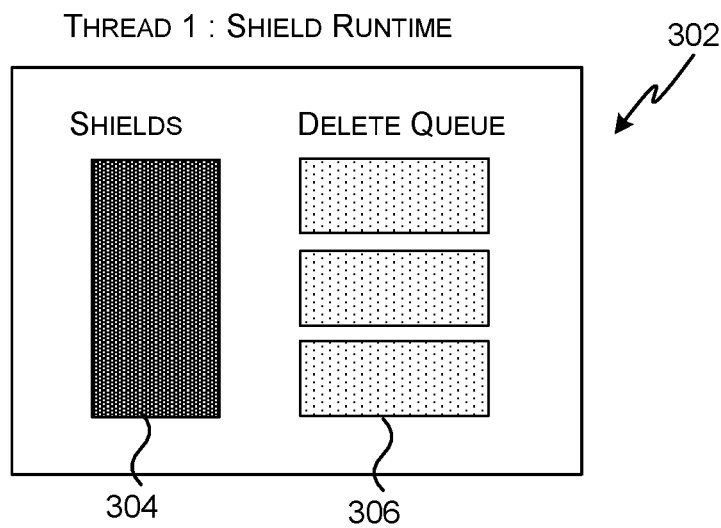
FIG. 3 is a schematic diagram showing the thread-local state for a thread.

FIG. 3 is a schematic diagram showing the thread-local state (TLS) 302 for a thread. In an example implementation, each thread holds a thread-local array of slots 304, each of which protects a manual object (or 0x01 for an unused slot). The shield (e.g. a Shield<T> struct) then holds a pointer (e.g. IntPtr in C#) capturing the address of the thread-local slot (slot field) that this shield is referring to. The TLS slot (in array 304) stores the address of the manual object. The same address—for efficient access that avoids TLS indirections—may also be cached as a field (value) of type T inside Shield<T> and may be returned by the Value property (where Value is one of the members exposed by the shield struct). Allocation of shields in such an implementation amounts to finding an unused TLS array slot (within array 304) and creating a shield that holds a pointer to that yet uninitialized slot. To initialize the shield so that it defends a particular object on the Manual Heap, the TLS slot is updated to contain the address of the manual object. To abandon a manual object, the object is added to a thread local list of objects that need to be reclaimed (which may also be referred to as a delete queue) 306. Occasionally, when the objects in the list (or delete queue) 306 consume too much space, a method is triggered to reclaim memory and this comprises checking that every thread's TLS shield array 304 does not contain the object. However, during that check some thread may be attempting to obtain a shield and correctness is achieved using one or more counters, as described below.

The use of counters can be described with reference to FIGS. 4-7. In the first example, shown in FIGS. 4 and 5, there is a global counter (or global epoch) 310 as well as local counters (or local epochs) 308A, 308B associated with each thread. In contrast, in the second example, shown in FIGS. 6 and 7, there is no global counter and the method uses only the local counters (or local epochs) 308A, 308B. These examples show only two threads (Thread 1 and Thread 2), however in other examples there may be more than two threads. In the examples described, thread 2 is the owner of an object X on the Manual Heap.

As described above with reference to FIG. 3, each thread has TLS 302A, 302B which includes an array of slots 304A, 304B for storing shields and a delete queue 306A, 306B. Additionally, the TLS 302A, 302B includes a local counter value (or local epoch) 308A, 308B. In the first example (shown in FIGS. 4 and 5) there is also global state which stores a global counter value (or global epoch) 310.

Figure 4:
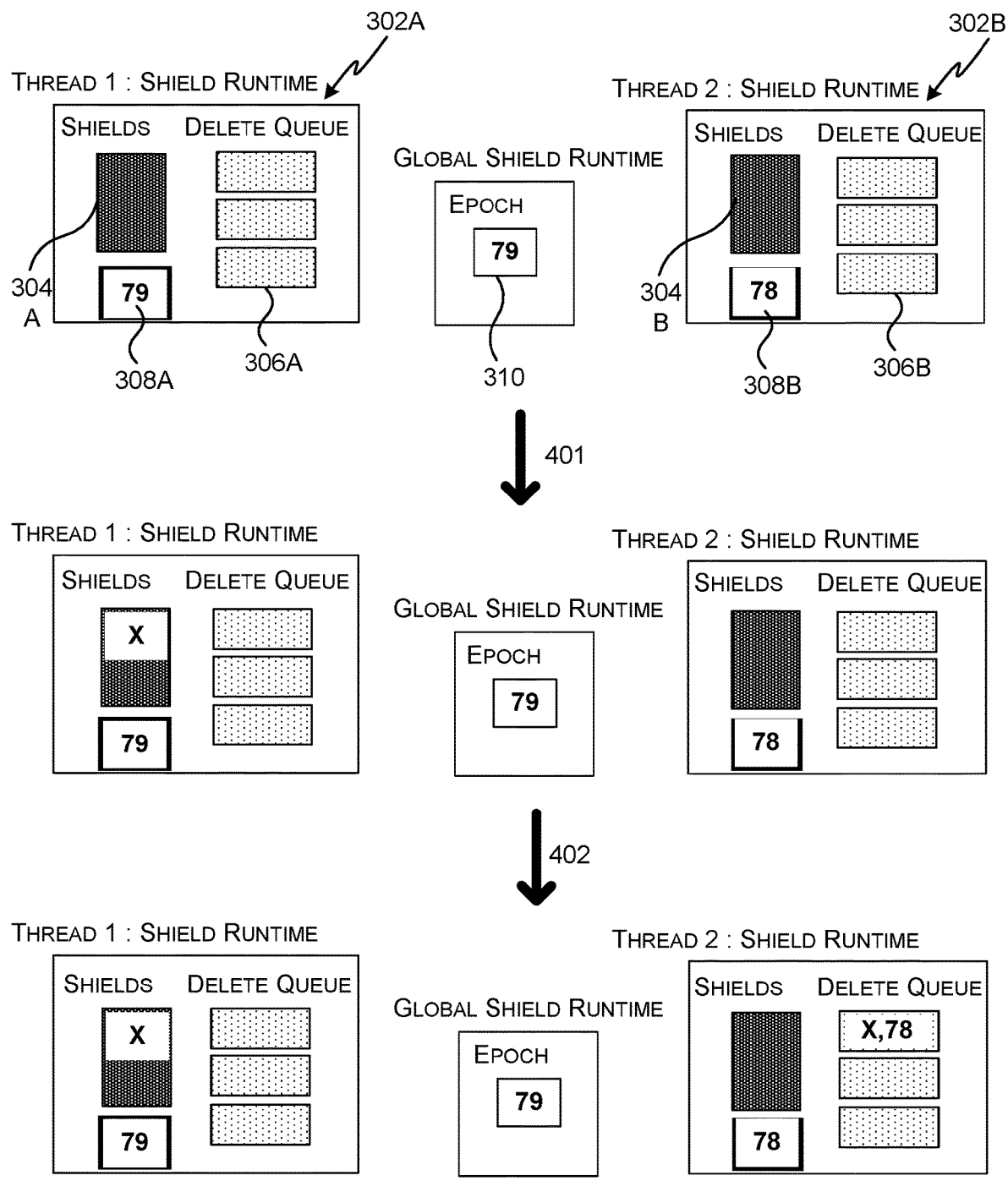
FIG. 4 is a schematic diagram showing a first part of a first example method of manual memory management.
Figure 5:
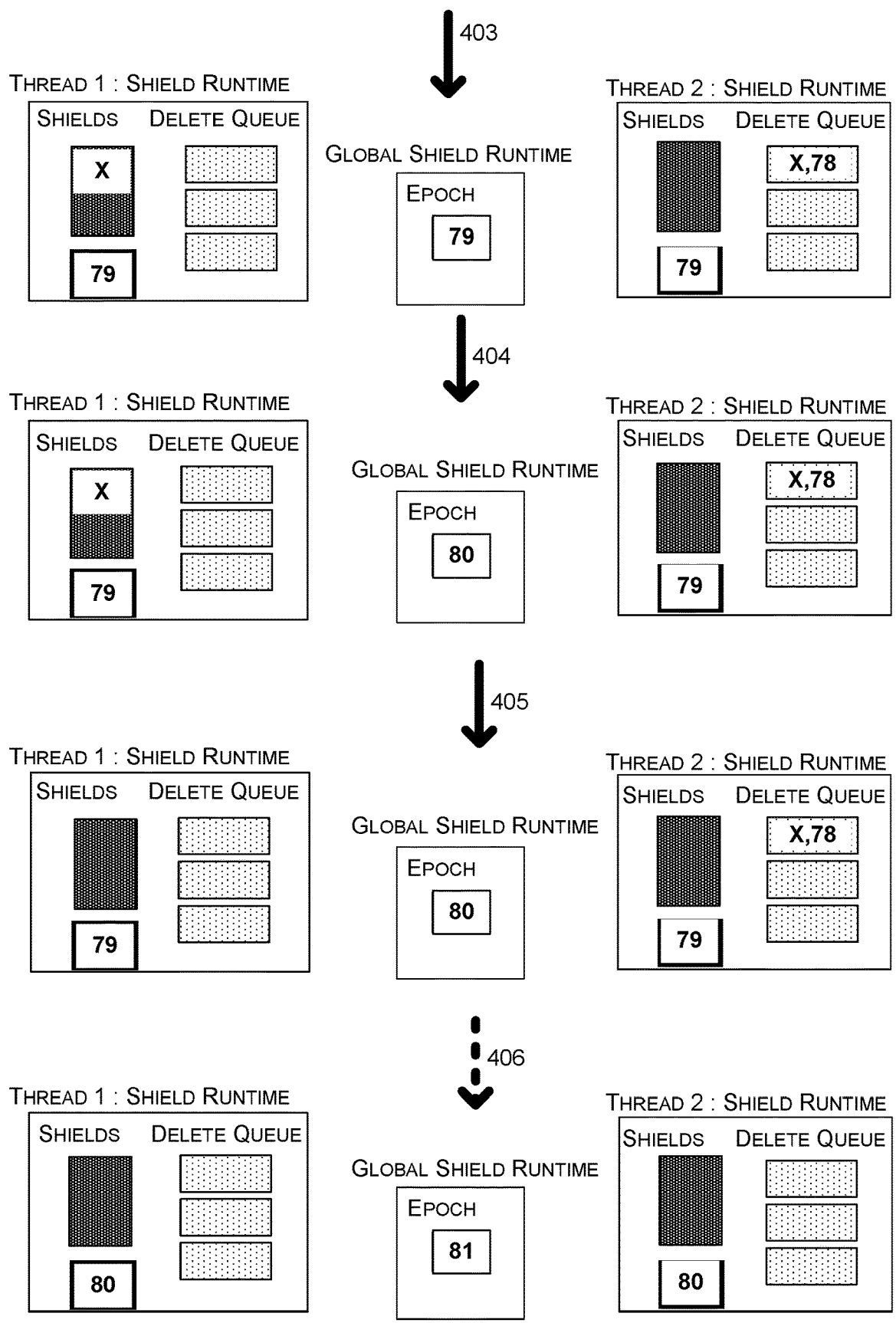
FIG. 5 is a schematic diagram showing a second part of the first example method of manual memory management.

In examples, such as the first example shown in FIGS. 4 and 5, where a global counter (or global epoch) 310 is used, a protocol is used to control the advancement of the global counter 310. The local counters 308A, 308B track the global counter 310 and if the thread adds an object to its delete queue 306A, 30B, this may trigger the advancement of the local counter 308A, 308B. If a running thread (i.e. a thread that is not stalled) detects that it is lagging behind the global counter 310, it sets its local counter 308A, 308B to be equal to the global counter 310. If the thread detects that all threads agree on their local counters 308A, 308B—and epoch advancement is heuristically sensible (e.g. when there are a significant number of objects, or a lot of memory, to be reclaimed)—then it performs an operation (e.g. a Compare and Swap, CAS, operation) that sets the global counter 310 to be the agreed upon value plus one. If multiple threads request advancement of the global counter 310 at the same time, the operation will only succeed for one of the threads and it will fail for the others. This guarantees that the global counter 310 is never more than one ahead of any local counter 308A, 308B.

In the first example, as shown in FIGS. 4 and 5, initially neither thread has any undisposed shields (as indicated by the empty slots in the arrays 304A, 304B) and the delete queues 306A, 306B for both threads are empty. In the example shown, initially the global counter 310 matches the local counter 308A of Thread 1 but the local counter 308B of Thread 2 lags behind by one. This means that the global counter 310 cannot advance at this point in time.

In the example shown, Thread 1 obtains a shield for object X which is owned by Thread 2 (operation 401) and this is recorded in the TLS 302A for Thread 1. Subsequently, Thread 2 adds object X and the current value of the local counter 308B to its delete queue 306B (operation 402) and then increments its local counter 308B (operation 403). In the example shown in FIGS. 4 and 5, the value 78 is added to the delete queue and then the local counter 308B is incremented by one from 78 to 79. At this point in time, object X cannot be deallocated because there is an undisposed shield to this object, but as all the threads agree on their local counters 308A, 308B, the global counter 310 can be advanced by one (operation 404). When Thread 1 disposes of its shield to object X (operation 405), this removes one of the criterion which is preventing the deallocation of object X; however, a second criterion remains that states that deallocation cannot occur until the global counter 310 has advanced by a pre-defined amount (e.g. three) compared to the counter value stored in the delete queue 306B. Once this condition is met, object X can be deallocated and the data is removed from the delete queue 306B of the owning thread (operation 406).

Whilst in the example described above with reference to FIGS. 4 and 5, it is a current local counter value which is stored in the delete queue, in other examples, the current value of the global counter may instead be stored in the delete queue.

Figure 6:
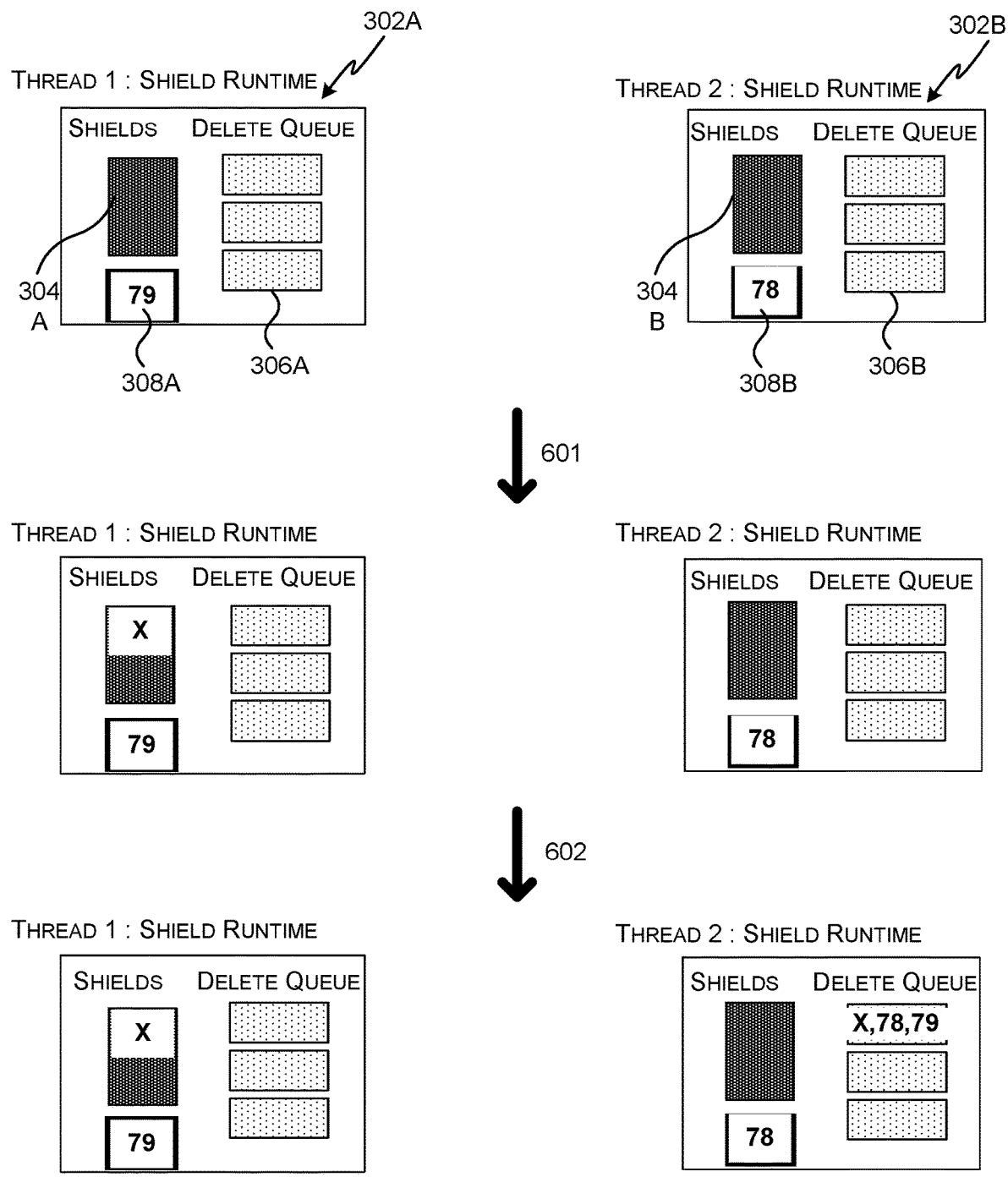
FIG. 6 is a schematic diagram showing a first part of a second example method of manual memory management.
Figure 7:
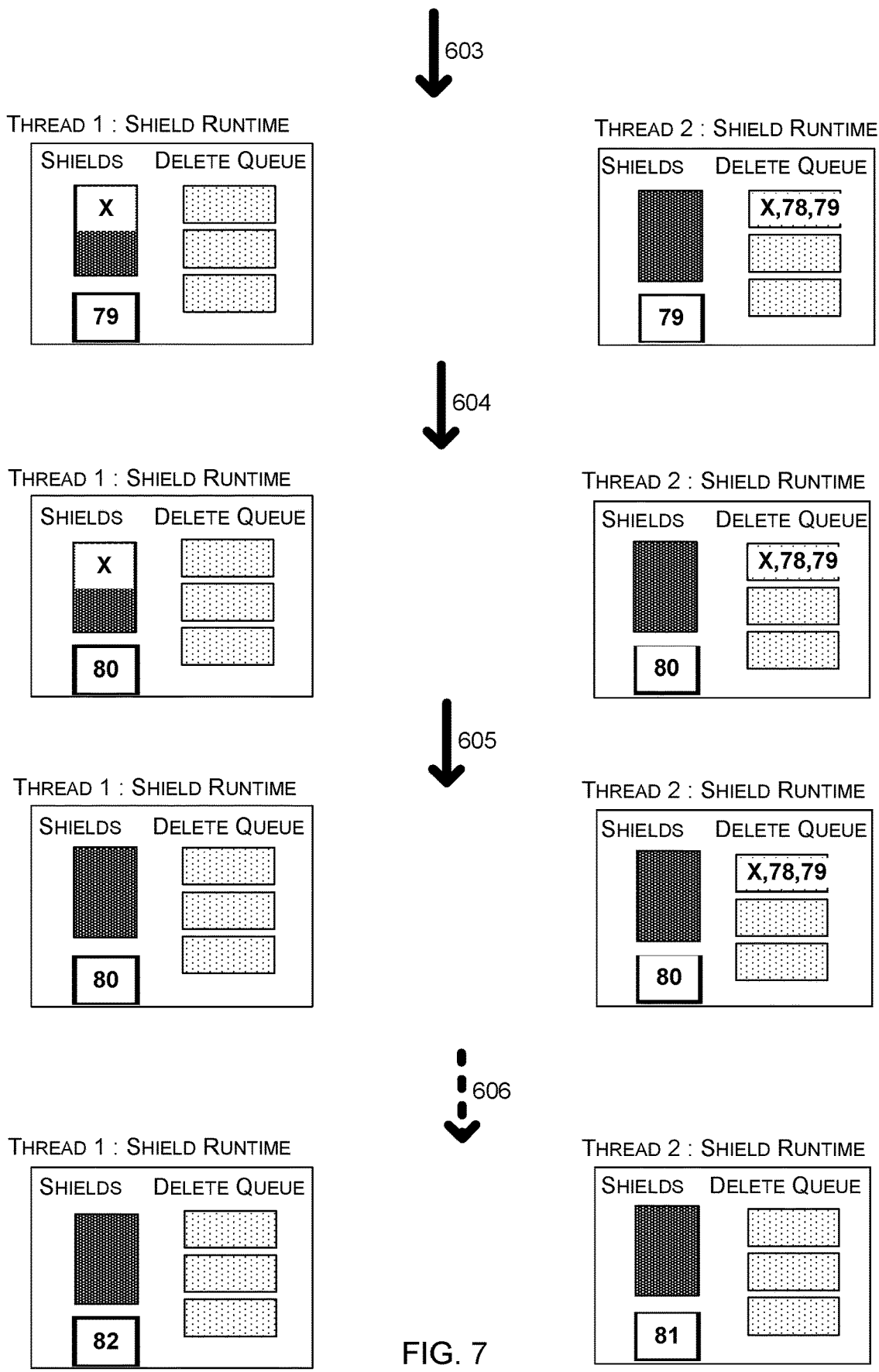
FIG. 7 is a schematic diagram showing a second part of the second example method of manual memory management.

In contrast, in examples, such as the second example shown in FIGS. 6 and 7, where a global counter is not used, a protocol is used to control the advancement of the local counters 308A, 308B. As before, if a thread adds an object to its delete queue 306A, 30B, this may trigger the advancement of the local counter 308A, 308B. If a thread detects that it is lagging behind the local counters of the other threads, it sets its local counter to be equal to the other local counters. If a thread detects that all threads agree on their local counters 308A, 308B then it performs an operation that sets all local counters to be the agreed upon value plus one. If multiple threads request advancement of their local counter at the same time, the operation will only succeed for one of the threads and it will fail for the others (e.g. because all the other local counters will no longer agree and hence the conditions for advancing the local counter are not met).

In the second example, as shown in FIGS. 6 and 7, initially neither thread has any undisposed shields (as indicated by the empty slots in the arrays 304A, 304B) and the delete queues 306A, 306B for both threads are empty. In the example shown, initially the local counter 308B of Thread 2 lags behind the local counter 308A of Thread 1 by one.

In the example shown, Thread 1 obtains a shield for object X which is owned by Thread 2 (operation 601) and this is recorded in the TLS 302A for Thread 1. Subsequently, Thread 2 adds object X and the current value of both of the local counters 308A, 308B to its delete queue 306B in a pre-defined order (operation 602) and then increments its local counter 308B (operation 603). In the example shown in FIGS. 6 and 7, the values 78 (the current value of the counter 308B for Thread 2) and 79 (the current value of the counter 308A for Thread 1) are added to the delete queue and then the local counter 308B is incremented by one from 78 to 79. At this point in time, object X cannot be deallocated because there is an undisposed shield to this object, but as all the threads agree on their local counters 308A, 308B, the local counters 308A, 308B can be advanced by one (operation 604). When Thread 1 disposes of its shield to object X (operation 605), this removes one of the criterion which is preventing the deallocation of object X; however, a second criterion remains that states that deallocation cannot occur until the local counters 308A, 308B have all advanced by a pre-defined amount (e.g. three) compared to the corresponding counter values stored in the delete queue 306B. Once this condition is met (operation 606), object X can be deallocated and the data is removed from the delete queue 306B of the owning thread.

In the example described with reference to FIGS. 6 and 7, the current values of each local counter are stored in the delete queue. This adding of all the current values of the local counters may be described as taking a snapshot of all the local counters and adding this snapshot to the delete queue associated with the deleted item. To improve efficiency, the snapshots may be taken periodically (rather than each time an object is added to the delete queue) and applied to all elements in the delete queue for the last period. For example, for every tenth item added to a delete queue, a snapshot may be taken and then that snapshot may be used for the previous ten entries in the delete queue.

As described above, there are two conditions which must be satisfied before deallocation of an object can occur:
There are no undisposed shields for the object; and
For each counter i with a value stored the delete queue, stored$_i$, in an entry associated with the object, the value of that counter, current$_i$, must have advanced by a pre-defined amount, d, (e.g. d=3) compared to the stored value, i.e. for all i, current$_i \geq$ stored$_i$+d.

Where a global counter 310 is used, there is only a single local counter value stored in the delete queue in an entry associated with an object, i.e. the local counter value for the owning thread; however, where a global counter is not used, a local counter value 308A, 308B is stored for each thread in the delete queue in an entry associated with an object and the condition must be satisfied for all local counters 308A,

308B. Deallocation may occur as soon as the two conditions are satisfied or may be performed periodically.

The second of the two conditions (i.e. the condition relating to the counter values) ensures that an object is not deallocated too early, e.g. to ensure that an object is not deallocated if a shield has already been requested but has not yet been written to the thread's TLS when a periodic memory reclaim operation is performed, i.e. when check is performed to determine which (if any) objects can be deallocated. As described above, the value of d may be set to a value of three or in other examples to a value which is more than three. The minimum value of three is selected because this ensures that all writes to the shield TLS will have hit the main memory as can be described with reference to FIG. 8.

Figure 8:
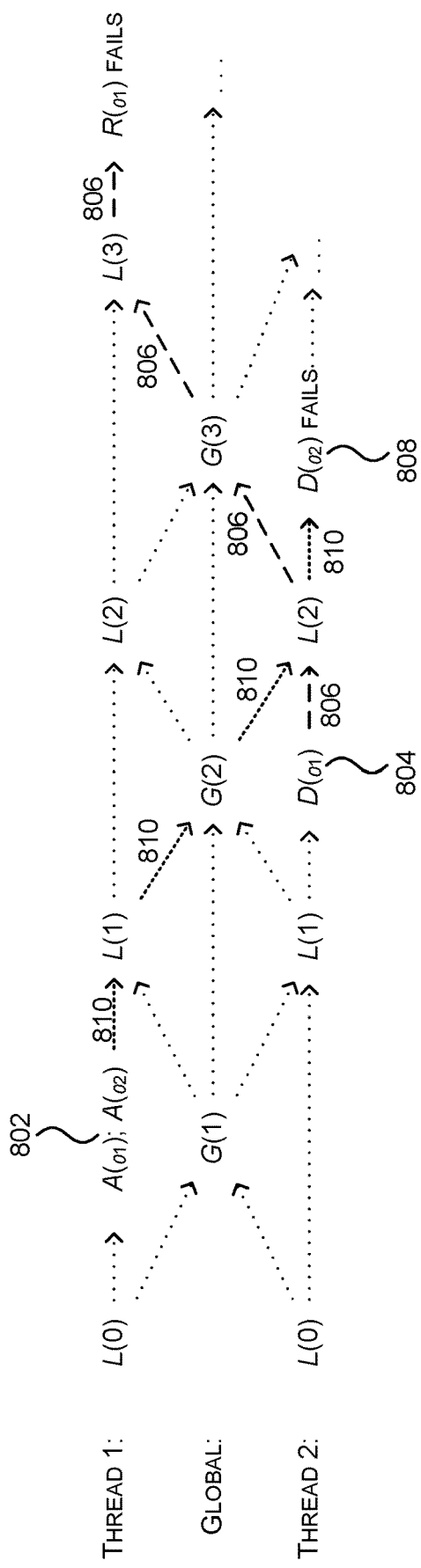
FIG. 8 is a schematic diagram showing the ordering of events using the methods of FIGS. 4-7.

FIG. 8 shows the ordering of events using the following notation:

Defend events, D(o)—which refer to the combined effects of requesting a shield, i.e. reading the address of an object, o, and storing it in the TLS shield array Abandon events, A(o)—which refer to the addition of an object, o, to the delete queue such that it is scheduled for deallocation Reclaim events, R(o)—which refer to the successful deallocation of an object, o.

In the example shown in FIG. 8, in epoch 0 (i.e. when the local counter for thread 1 has a value of zero, denoted L(0)), Thread 1 abandons both o1 and o2 (A(o1);A(o2), 802). There are several possibilities for Thread 2:

If a defend event D(o1) 804 occurs in epoch 1 (i.e. when the local counter for thread 2 has a value of one, denoted L(1)). The effects of this event (in particular the write to the TLS slot) are guaranteed to be visible by epoch 3 in Thread 1 (L(3) for Thread 1), as the dashed arrows 806 indicate.

If Thread 2 attempts to defend an object o2 in a later epoch, epoch 2 (D(o2), 808), as the dotted arrows 810 indicate, the abandon event of o2 (A(o2) 802) must have become visible by now and there is no violation of safety.

If Thread 2 defends one of o1 and o2 earlier (e.g. in L(0)) then less than three epochs suffice (this is not shown in FIG. 8).

Consequently, in all cases it is not necessary to wait more than three epochs (i.e. the minimum value of d is 3) to safely delete an object if it is not contained in some TLS shield array.

In various implementations, to efficiently represent the epoch an object was abandoned in, a cyclic ring buffer which is segmented into four partitions may be used to provide the delete queue. Three partitions may be used for the most recent epochs and one for the spare capacity.

The reasoning set out above with reference to FIG. 8 relies on the abandon and defend events being atomic with respect to local counter advancement. This holds as each thread is responsible for advancing its own local counter (as described above).

Whilst the examples described above involved an owner thread, with an object created in the manual heap having a single owning thread, variations of the methods described above may be implemented without the concept of owners. In such examples, reference counting may be used to determine when to add an object to a delete queue instead of explicit abandonment of an object by its owner. Where reference counting is used, the number of references in the heap (e.g. in both the Manual Heap and the GC heap) to the object are counted and when there are zero references to an object in the heap, the object is added to the delete list and may be abandoned based on the criteria described above (e.g. based on whether there are any undisposed shields and on conditions relating to the advancement of one or more counters).

In various examples, the methods described above may additionally include a mechanism for ejecting a thread from the protocol used to advance the counters. This ejection mechanism means that if a thread is blocked (e.g. because of an input/output or because it is trying to take a lock), goes into unmanaged code or goes into a tight computation loop, that thread does not hold up the deallocation of objects.

The ejection mechanism can be described with reference to FIG. 9 where a global counter 310 is used and with reference to FIG. 10 where there is no global counter.

As described above with reference to FIGS. 4 and 5, when Thread 1 disposes of its shield to object X (operation 405), this removes one of the criterion which is preventing the deallocation of object X; however, a second criterion remains that states that deallocation cannot occur until the global counter 310 has advanced by a pre-defined amount (e.g. three) compared to the counter value stored in the delete queue 306B (where this counter value may be a local counter value or the global counter value). If thread 1 is blocked, goes into unmanaged code or a tight computation loop, then its local counter 308A cannot advance and this delays satisfying the second criterion and hence delays the deallocation of object X. As shown in FIG. 9, the counter 308B of Thread 2 may advance so that it is the same as the global counter 310 (operation 901) but it is then blocked from further advancement as it cannot advance past the global counter 310 and the global counter 310 cannot advance until all the local counters 308A, 308B are the same. This may be addressed by ejecting Thread 1 from the protocol (operation 902).

When Thread 2 ejects Thread 1, Thread 1 is prevented from taking any further shields. This may, for example, be implemented by making the TLS shield array 304A for Thread 1 read only (e.g. using VirtualProtect in Windows or mprotect in Linux) or by setting a flag (e.g. a bit) in the TLS 302A for Thread 1 indicating that no shields can be taken by that thread. Where the TLS shield array 304A is made read-only, an access violation occurs if Thread 1 attempts to take a shield (because the object address cannot be written into a slot in the array 304A). Where a flag is set, this flag in TLS is checked whenever a thread wants to take a shield and this is prevented if the flag is found to be set.

In addition to preventing the ejected thread (Thread 1) from taking further shields, its local counter 308A is set to a special value (denoted EJECT in FIG. 9) which allows the global counter advancing check operation to ignore that thread. Consequently, as shown in FIG. 9, the global counter 310 can advance (operation 903) and once the second condition for deallocation is met, object X can be deallocated and the data is removed from the delete queue 306B of the owning thread (operation 904).

As described above with reference to FIGS. 6 and 7, when Thread 1 disposes of its shield to object X (operation 605), this removes one of the criterion which is preventing the deallocation of object X; however, a second criterion remains that states that deallocation cannot occur until the local counters 308A, 308B have all advanced by a pre-defined amount (e.g. three) compared to the corresponding counter values stored in the delete queue 306B. If thread 1 is blocked, goes into unmanaged code or a tight computation loop, then its local counter 308A cannot advance and this delays satisfying the second criterion and hence delays the deallocation of object X. As shown in FIG. 10, the counter 308B of Thread 2 may advance (operation 1001) but deallocation of object X will be blocked because even if the counter 308B of Thread 2 advances further, the value of the local counter 308A of thread 1 will not. This may be addressed by ejecting Thread 1 from the protocol (operation 1002).

When Thread 2 ejects Thread 1, Thread 1 is prevented from taking any further shields and any of the mechanisms described above with reference to FIG. 9 may be used. Furthermore, in addition to preventing the ejected thread (Thread 1) from taking further shields, its local counter 308A is set to a special value (denoted EJECT in FIG. 10) which allows the local counter advancing check operations for other threads to ignore that thread. Consequently, as shown in FIG. 9, the local counter 308B can advance (operation 1003) and once the second condition for deallocation is met, object X can be deallocated and the data is removed from the delete queue 306B of the owning thread (operation 1004).

Figure 9:
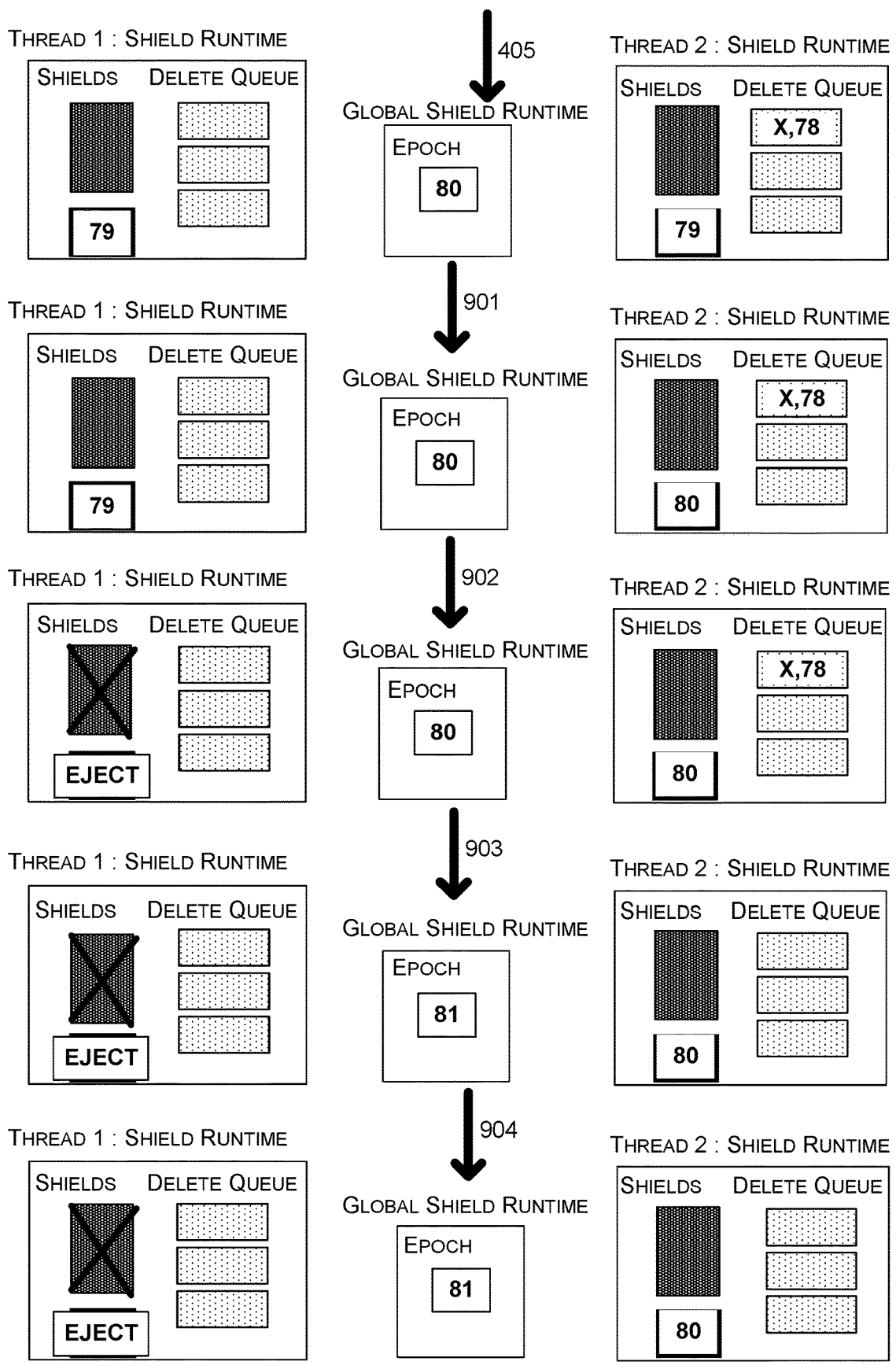
FIG. 9 is a schematic diagram showing an optional extension to the method of FIGS. 4-5.
Figure 10:
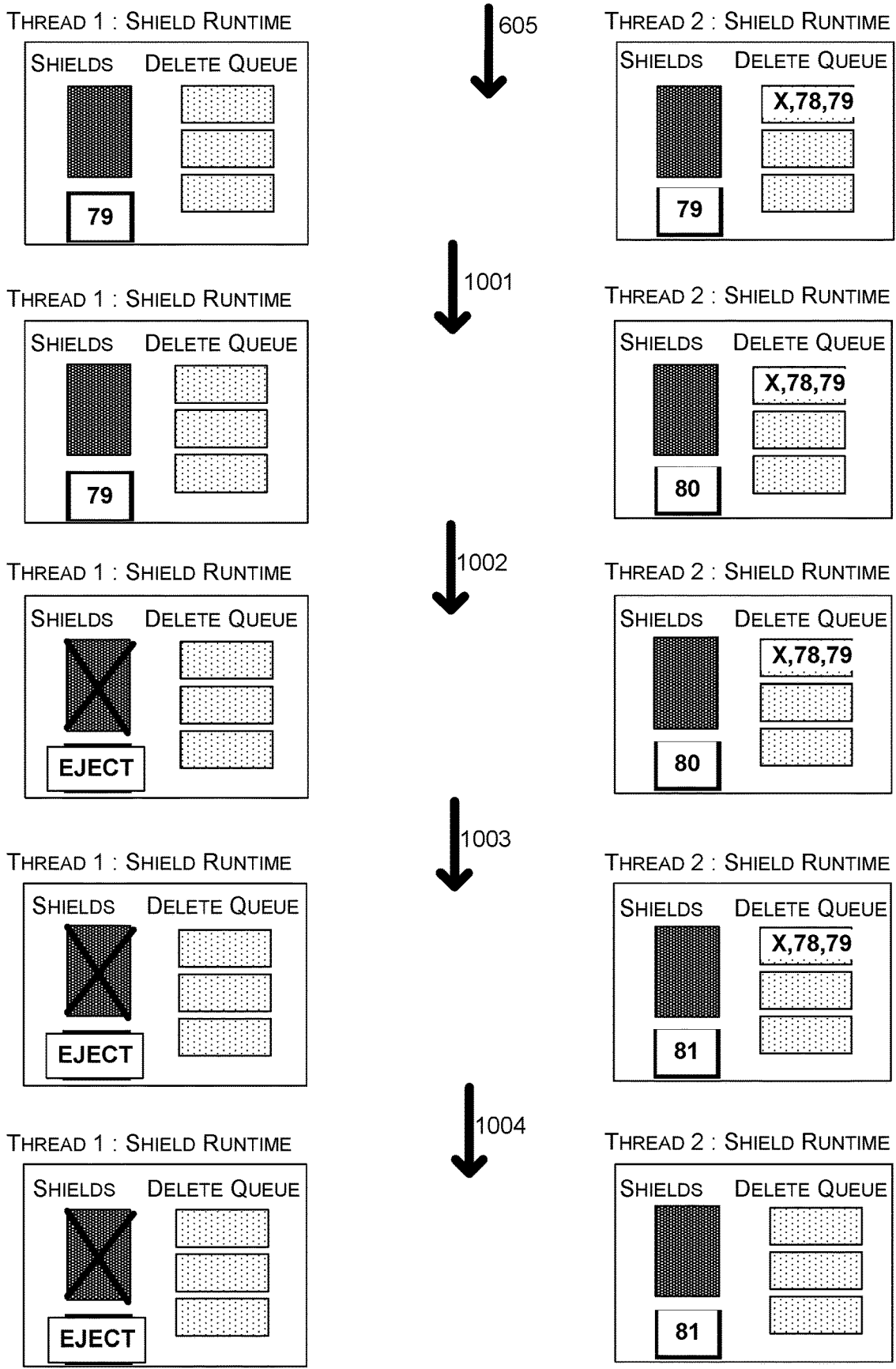
FIG. 10 is a schematic diagram showing an optional extension to the method of FIGS. 6-7.

In implementations where there are more than two threads, more than one thread may attempt to eject the blocking thread (e.g. Thread 1 in the examples of FIGS. 9 and 10). Consequently, an ejection lock mechanism may be provided which guarantees that only one thread will succeed in ejecting a particular thread. In such a mechanism, a thread that wants to eject another thread has to obtain the ejection lock before it can evict a thread and only the thread with the ejection lock can evict a thread.

To obtain a shield, the ejected thread (Thread 1 in the examples of FIGS. 9 and 10), needs to first rejoin the protocol. This is performed by reversing the changes made when the thread was ejected, for example by setting the local counter 308A back to a valid value (e.g. a value which is the same as the other local counters or one less than the other local counters) and either unprotecting the TLS shield array (e.g. where that was made read-only on ejection) or resetting the flag (e.g. where that was set on ejection).

In a variation on the method shown in FIG. 10, instead of setting the local counter 308A of the ejected thread to a special value, a counter flag may be set. Like the use of the special value (described above), the setting of the counter flag allows the local counter advancing check operations for other threads to ignore that thread. To rejoin the protocol, the counter flag is unset and depending upon the implementation, the TLS shield array is unprotected or the flag that prevents writes to the array (described above) is reset. In various examples, a single flag may be used both to control write access to the TLS shield array and to determine whether the local counter is to be ignored in local counter advancing check operations.

In various examples, the rejoining of the protocol is triggered by an access violation or other error which is caused by the ejected thread attempting to obtain a shield. For example, where the TLS shield array 303A is read only, the access violation which results from an attempt to write an object address into the array is trapped, the protocol is rejoined (as described above) and then the action to take a shield is replayed (after rejoining is complete).

As described above, when in an ejected state, a thread cannot take any further shields; however, it may still be the owner of an object and is still able to schedule that object for deallocation (e.g. using an Abandon event). When an object is scheduled for deallocation, it is added to the delete queue 306A, 306B along with the current value of one or more local counters (e.g. the particular thread's local counter where a global counter is used or the current values for the local counters for all threads where there is no global counter) and if the thread has been ejected, its local counter has a special value (e.g. EJECT). Consequently, where a global counter is used, the current value of the global counter (or one less than the current value of the global counter) may be stored in the delete queue instead of the current value of the thread's local counter (e.g. instead of storing EJECT) or, where only local counters are used, the value of the counter prior to ejection of the thread plus a value d (which is the amount by which the counters must increment before deallocation can occur, as detailed above) or current value of another local counter may be stored in place of the current value of the thread's local counter.

Using the methods described above, whilst an object in the Manual Heap can have only a single owning pointer, deallocation can occur at any program point and concurrent sharing of the objects amongst all the threads in the program is permitted through the use of shields. As described above, accessing a manual object is enabled by getting a reference from a shield, which creates state in thread local storage that prevents deallocation while the object is being used. Shields can only be created from the unique owning reference, thus when the reference is destroyed no more shields can be created and memory can be safely reclaimed once all previously active shields have been disposed. The combination of the use of shields with use of counters (or epochs) provides a mechanism to determine when it is safe to deallocate an object on the manual heap without using locks, fences or other synchronization techniques (which are expensive in terms of runtime performance as they take a lot of clock cycles).

As described above, the methods of safe memory management described above may be used in combination with GC or may be used separately from GC. Where the methods are used in combination with GC, a programmer can choose between allocating objects on the GC heap or the manual heap. Experimental results have shown significant performance gains (compared to only using GC) particularly in multithreaded scenarios, e.g. good reductions in peak working sets because of prompt deallocation and good scalability of throughput with multiple threads due to the lock-free use of shields and counters.

The methods described herein may, for example, be implemented as a fork of the Microsoft .NET implementation, for example by modifying the .NET runtime (Core-CLR) and extending the standard libraries (CoreFX) with APIs that use manual memory (e.g. for manual heap allocations, jemalloc, which is an industrial size-class-based allocator, has been integrated). In other examples the methods may be added to other languages (e.g. to C or C++) to provide a method of safe manual memory management for those languages.

The methods described herein may be implemented within a library, within a language runtime or within a data structure. The methods may be run on any hardware, such as the computing-based device described below with reference to FIG. 11.

The methods described herein provide a very efficient way of building a data structure, such as a dictionary, in which objects are allocated and deallocated and used by many threads.

Some of the examples described above are described using C#syntax. This is used by way of example only. Using this C#syntax, an example public interface of an API for the methods described herein is:

```
struct Owner<T> where T : class {
    Shield<T> Defend( );
    void Move<S>(ref Owner<S> x) where S:class, T;
    void Abandon( );
}
struct Shield<T> : IDisposable where T:class {
    static Shield<T> Create( );
    void Defend(ref Owner<T> u);
    T Value;
    void Dispose( );
}
class ManualHeap {
    void Create<T>(ref Owner<T> dst) where
    T:class, new( );
    void Create Array<S>(refOwner<S[ ]> dst, int
    len);
}
```

As described above Owner<T> encapsulates a (private) pointer to a manual object and for safe use of this API, no two Owner<T> structs can refer to the same manual object. As described above, Owner<T> is defined as a struct, to incur no GC allocation overhead (otherwise, for every manual object one extra GC allocation would be incurred). A consequence of the use of a struct is that Owner<T> can only be passed to functions by reference (otherwise it would be possible to violate the unique owner assumption).

Struct Owner<T> exposes three methods. The first Defend( ) returns a Shield<T> and prevents (by publishing the manual object associated with this owner in thread-local state) deallocation of this object. The second Abandon( ) zeroes out the internal pointer to the manual object, so that no new Shield<T> can be obtained, and schedules the manual object for deallocation at some safe point in the future, when it is no longer protected by any shield in any thread. The final method Move(ref Owner<S> x) where S:class,T, corresponds to transferring ownership from x to this struct. The underlying manual object that this struct is referring to will be scheduled for deallocation at some later safe point, since—by the unique owner assumption—this was the only owner of that object.

As described above, Shield<T> acts as an access token to the underlying object. It can be obtained from the Defend( )method of an Owner<T> and encapsulates a reference to thread-local state that records the underlying manual object as one whose memory cannot be reclaimed. It exposes the following members: Value, is a property that gives access to the underlying manual object; and Dispose( ) un-registers the manual object that this shield protects from thread-local state, making it thus a candidate for deallocation.

An escape analysis at the C#frontend may be used to ensure that the result of Value from a shield does not escape beyond the Dispose( ) for that shield. Shields—like owners—cannot be copied but rather are passed by reference to eliminate the danger of using a copy of a shield to access the underlying Value after calling Dispose( ) on the original.

The lifetime of a shield is not tied to a specific access of a specific owner. Shields are only references to slots in thread local state and can be created in uninitialized form, and be used to defend multiple objects. For this reason Shield<T> exposes two more methods: Create( ) which simply creates a new uninitialized shield that does not yet defend any object against deallocation; and Defend(ref Owner<T> u) which defends a new owner, and un-defends the owner it previously defended, if any. For instance, it may be undesirable to create and dispose a shield on every iteration of a loop that accesses manual objects. Instead a shield can be created before the loop and disposed of in the end, but continuously re-use it to defend each item in each iteration.

Unlike owners, shields cannot be stored on the heap. The reason is that shields encapsulate references to thread-local state, and storing them on the heap makes them accessible to other threads for which the TLS reference is not meaningful.

The .NET API above exposes Create( ) and Create-Array( ) methods for allocating objects and arrays. These methods allocate in the manual heap and transfer ownership of the newly allocated object to the destination owner. In a C#frontend new Owner<MyClass>( . . . ) may be used for allocating in the manual heap and calling a constructor.

Figure 11:
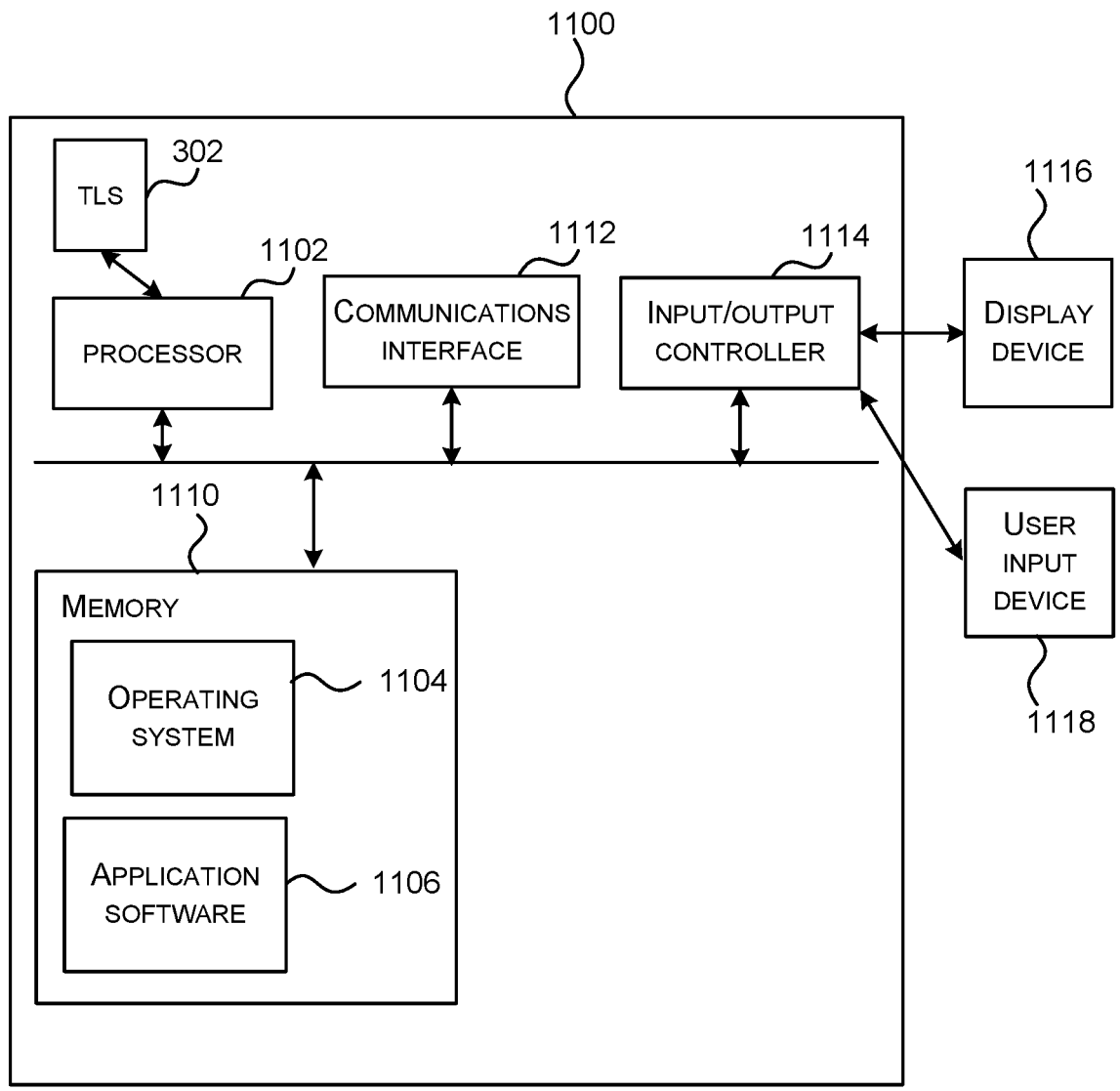
FIG. 11 illustrates an exemplary computing-based device in which embodiments of the methods of memory management described herein may be implemented.

FIG. 11 illustrates various components of an exemplary computing-based device 1100 which are implemented as any form of a computing and/or electronic device, and in which embodiments of the methods described herein may be implemented in some examples.

Computing-based device 1100 comprises one or more processors 1102 which are microprocessors, controllers or any other suitable type of processors for processing computer executable instructions to control the operation of the device in order to implement safe manual memory management. In some examples, for example where a system on a chip architecture is used, the processors 1102 include one or more fixed function blocks (also referred to as accelerators) which implement a part of the method of manual memory management in hardware (rather than software or firmware). Platform software comprising an operating system 1104 or any other suitable platform software is provided at the computing-based device to enable application software 1106 to be executed on the device. The thread-local state 302 may be stored in memory which may be part of the processor 1102 or separate from, but accessible by, the processor 1102 (e.g. part of memory 1110).

The computer executable instructions are provided using any computer-readable media that is accessible by computing based device 1102. Computer-readable media includes, for example, computer storage media such as memory 1110 and communications media. Computer storage media, such as memory 1110, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1110) is shown within the computing-based device 1100 it will be appreciated that the storage is, in some examples, distributed or located remotely and accessed via a network or other communication link (e.g. using communication interface 1112).

The computing-based device 1100 also comprises an input/output controller 1114 arranged to output display information to a display device 1116 which may be separate from or integral to the computing-based device 1100. The display information may provide a graphical user interface. The input/output controller 1114 is also arranged to receive and process input from one or more devices, such as a user input device 1118 (e.g. a mouse, keyboard, camera, microphone or other sensor). In some examples the user input device 1118 detects voice input, user gestures or other user actions and provides a natural user interface (NUI). This user input may be used to control the operation of the computing device 1100. In an embodiment the display device 1116 also acts as the user input device 1118 if it is a touch sensitive display device. The input/output controller 1114 outputs data to devices other than the display device in some examples.

Any of the input/output controller 1114, display device 1116 and the user input device 1118 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Figure 12:
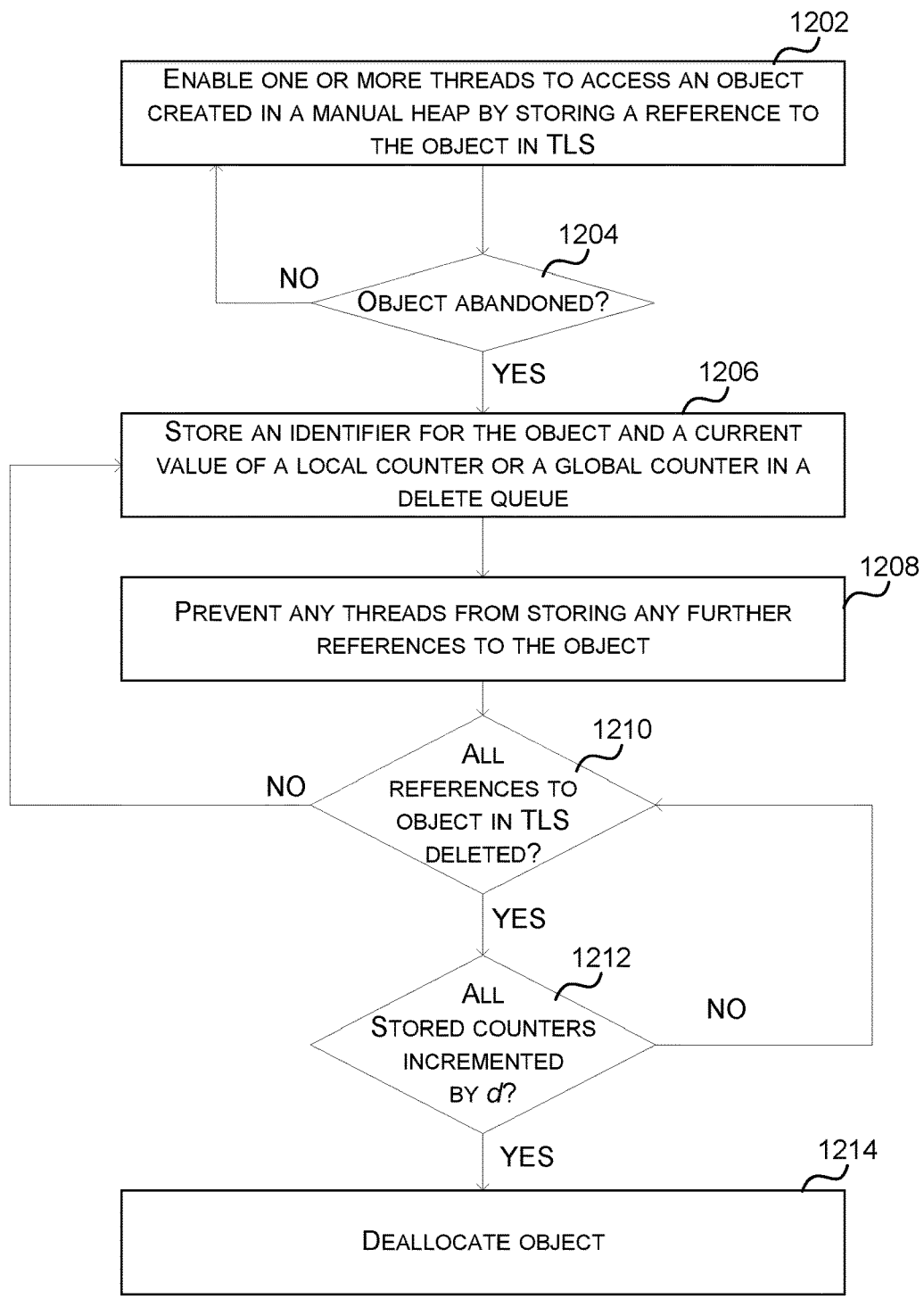
FIG. 12 is a flow diagram of an example method of memory management.

FIG. 12 is a flow diagram of an example method of manual memory management, such as the examples described above with reference to FIGS. 4-7. As shown in FIG. 12, the method comprises enabling one or more threads to access an object created in a manual heap by storing a reference to the object in thread-local state (302, 302A, 302B) and subsequently deleting the stored reference after accessing the object (block 1202). In response to abandonment of the object ('Yes' in block 1204), the following items are stored in a delete queue (306, 306A, 306B, block 1206):
an identifier for the object; and
a current value of a local counter of a thread or a local counter of all of the threads or a global counter.

Once the object has been abandoned ('Yes' in block 1204), the method further comprises preventing any threads from storing any further references to the object in thread-local state (block 1208) and enabling deallocation of the object (block 1214) only when all references to the object stored in thread-local state for any threads have been deleted ('Yes' in block 1210) and a current value of the local counter (308A, 308B) for the thread or the global counter (310) has incremented to a value that is at least a pre-defined amount more than the stored value ('Yes' in block 1214). As described above in examples where a global counter is used, the global counter is updated using one or more local counters.

Although the present examples are described and illustrated herein as being implemented in a computing device as shown in FIG. 11, the system described is provided as an example and not a limitation. As those skilled in the art will appreciate, the present examples are suitable for application in a variety of different types of computing devices.

A first further example provides a method of manual memory management comprising: enabling one or more threads to access an object created in a manual heap by storing a reference to the object in thread-local state and subsequently deleting the stored reference after accessing the object; and in response to abandonment of the object, storing an identifier for the object and a current value of a local counter of a thread or a global counter in a delete queue, preventing any threads from storing any further references to the object in thread-local state and enabling deallocation of the object only when all references to the object stored in thread-local state for any threads have been deleted and a current value of the local counter for the thread or the global counter has incremented to a value that is at least a pre-defined amount more than the stored value, wherein the global counter is updated using one or more local counters.

Alternatively or in addition to the other examples described herein, the method of the first further example may include any combination of one or more of the following features:
   In response to abandonment of the object, an identifier for the object and a current value of a local counter of a thread may be stored in the delete queue.
   In response to abandonment of the object, an identifier for the object and a current value of the local counter of an owning thread may be stored in a delete queue.
   In response to abandonment of the object, an identifier for the object and a current value of a local counter of a deallocating thread may be stored in a delete queue.
   In response to abandonment of the object, an identifier for the object and a current value of the local counters of each of the threads may be stored in a delete queue.
   In response to abandonment of the object, an identifier for the object and a current value of a global counter may be stored in a delete queue.
   Where a value of one or more local counters are stored in a delete queue in response to abandonment of the object, deallocation may only be enabled when the current values of the one or more local counters have incremented to values which are at least a pre-defined amount more than the corresponding stored values.
   Where a value of one or more local counters are stored in a delete queue in response to abandonment of the object, deallocation may only be enabled when the current values of a global counter updated based on the one or more local counters has incremented to values which are at least a pre-defined amount more than the corresponding stored values.
   Where a value of a global counter is stored in a delete queue in response to abandonment of the object, deallocation may only be enabled when the current values of the global counter has incremented to values which are at least a pre-defined amount more than the corresponding stored values.
   The method may further comprise: in response to detecting, by a first thread, that a second thread is preventing the global counter or a local counter of the first thread from being incremented, preventing the second thread from storing references to any objects in thread-local state and excluding the second thread from any determination of whether to increment the global counter or the local counter of the first thread.

References to objects created in the manual heap may be stored in an array in the thread-local state and wherein preventing the second thread from storing references to any objects in thread-local state may comprise: setting the array in the thread-local state for the second thread to read-only access.

References to objects created in the manual heap may be stored in an array in the thread-local state and wherein preventing the second thread from storing references to any objects in thread-local state may comprise: setting a flag in the thread-local state for the second thread, and wherein: enabling a thread to access an object created in the manual heap comprises: checking the flag in thread-local state for the thread; in response to determining that the flag is not set, storing a reference to the object in the array; and in response to determining that the flag is set, preventing the storing of a reference to the object in the array.

Excluding the second thread from any determination of whether to increment the global counter or the local counter of the first thread may comprise: setting a local counter of the second thread to a pre-defined value, wherein the pre-defined value indicates that it is to be excluded from any determination of whether to increment the global counter or the local counter of the first thread.

Deallocation of the object may be enabled only when all references to the object stored in thread-local state for any threads have been deleted and a current value of the global counter has incremented to a value that is at least a pre-defined amount more than the stored value.

Each thread may have a local counter value stored in thread-local state.

The method may further comprise: in response to determining that all of the local counter values are equal to the value of the global counter, incrementing the value of the global counter by one.

An object created in a manual heap by an owner thread may have a single owning pointer to the object and the method may further comprise: in response to abandonment of the object by the owner thread, incrementing the local counter value of the owner thread by one.

The method may further comprise: in response to determining that the local counter value of a thread is less than the value of the global counter, setting the local counter value of the thread to be equal to the value of the global counter.

An object created in a manual heap by an owner thread may have a single owning pointer to the object and wherein each thread has a local counter value stored in thread-local state and in response to abandonment of the object by the owner thread, the method further comprises storing a current value of a local counter of each other thread in the delete queue with the identifier for the object and the current value of the local counter of the owner thread, and wherein deallocation of the object is enabled only when all references to the object stored in thread-local state for any threads have been deleted and a current value of each local counter has incremented to a value that is at least a pre-defined amount more than the stored value for that local counter.

The method may further comprise: in response to determining that all of the local counter values are equal, incrementing the value of at least one of the local counters by one.

An object created in a manual heap by an owner thread has a single owning pointer to the object and the method further comprising: in response to abandonment of the object by the owner thread, incrementing the local counter value of the owner thread by one.

The method may further comprise: in response to determining that the local counter value of a thread is less than the value of the local counters of all other threads, setting the local counter value of the thread to be equal to the value of the other local counters.

The pre-defined amount may be three.

The pre-defined amount may be equal to or greater than three.

The pre-defined amount may be greater than three.

A second further example provides a device comprising: a processor; memory arranged to store thread-local state for each of a plurality of threads; and memory arranged to store device-executable instructions that when executed by the processor, cause the processor: to enable one or more threads to access an object created in a manual heap by storing a reference to the object in thread-local state and subsequently deleting the stored reference after accessing the object; and in response to abandonment of the object, to store an identifier for the object and a current value of a local counter of a thread or a global counter in a delete queue, to prevent any threads from storing any further references to the object in thread-local state and to enable deallocation of the object only when all references to the object stored in thread-local state for any threads have been deleted and a current value of the local counter for the thread or the global counter has incremented to a value that is at least a pre-defined amount more than the stored value, wherein the global counter is updated using one or more local counters.

A third further example provides a computer readable medium arranged to store device-executable instructions that when executed by a processor, cause the processor: to enable one or more threads to access an object created in a manual heap by storing a reference to the object in thread-local state and subsequently deleting the stored reference after accessing the object; and in response to abandonment of the object, to store an identifier for the object and a current value of a local counter of a thread or a global counter in a delete queue, to prevent any threads from storing any further references to the object in thread-local state and to enable deallocation of the object only when all references to the object stored in thread-local state for any threads have been deleted and a current value of the local counter for the thread or the global counter has incremented to a value that is at least a pre-defined amount more than the stored value, wherein the global counter is updated using one or more local counters.

Alternatively or in addition to the other examples described herein, the method of the second and third further examples may include any combination of one or more the features listed above with reference to the first further example and/or any combination of one or more of the following features:

The device-executable instructions may further comprise instructions that when executed by the processor, cause the processor to: detect, by a first thread of the plurality of threads, that a second thread of the plurality of threads is preventing the global counter or a local counter of the first thread from being incremented; and in response to detecting that the second thread is preventing the global counter or a local counter of the first thread from being incremented, prevent the second thread from storing references to any objects in thread-local state and exclude the second thread from any determination of whether to increment the global counter or the local counter of the first thread.

References to objects created in the manual heap may be stored in an array in the thread-local state and wherein the device-executable instructions, when executed by the processor, prevent the second thread from storing references to any objects in thread-local state by: setting the array in the thread-local state for the second thread to read-only access.

References to objects created in the manual heap may be stored in an array in the thread-local state and wherein the device-executable instructions, when executed by the processor, prevent the second thread from storing references to any objects in thread-local state by: setting a flag in the thread-local state for the second thread.

Deallocation of the object may be enabled only when all references to the object stored in thread-local state for any threads have been deleted and a current value of the global counter has incremented to a value that is at least a pre-defined amount more than the stored value.

Each thread may have a local counter value stored in thread-local state and the device-executable instructions may further comprise instructions that when executed by the processor, cause the processor: in response to determining that all of the local counter values are equal to the value of the global counter, to increment the value of the global counter by one.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method of manual memory management comprising:
enabling one or more threads to access an object created in a manual heap by storing a reference to the object in thread-local state and subsequently deleting the stored reference after accessing the object; and
in response to abandonment of the object:
storing an identifier for the object and a current value of a local counter of a thread or a global counter in a delete queue,
preventing any threads from storing any further references to the object in thread-local state, and
enabling deallocation of the object only when all references to the object stored in thread-local state for any threads have been deleted and a current value of the local counter for the thread or the global counter has incremented to a value of three more than the stored value, wherein the global counter is updated using one or more local counters.

2. The method according to claim 1, further comprising:
in response to detecting, by a first thread, that a second thread is preventing the global counter or a local counter of the first thread from being incremented, preventing the second thread from storing references to any objects in thread-local state and excluding the second thread from any determination of whether to increment the global counter or the local counter of the first thread.

3. The method according to claim 2, wherein references to objects created in the manual heap are stored in an array in the thread-local state and wherein preventing the second thread from storing references to any objects in thread-local state comprises:
setting the array in the thread-local state for the second thread to read-only access.

4. The method according to claim 2, wherein references to objects created in the manual heap are stored in an array in the thread-local state and wherein preventing the second thread from storing references to any objects in thread-local state comprises:
setting a flag in the thread-local state for the second thread,
and wherein:
enabling a thread to access an object created in the manual heap comprises:
checking the flag in thread-local state for the thread;
in response to determining that the flag is not set, storing a reference to the object in the array; and
in response to determining that the flag is set, preventing the storing of a reference to the object in the array.

5. The method according to claim 2, wherein excluding the second thread from any determination of whether to increment the global counter or the local counter of the first thread comprises:
setting a local counter of the second thread to a pre-defined value, wherein the pre-defined value indicates that it is to be excluded from any determination of whether to increment the global counter or the local counter of the first thread.

6. The method according to claim 2, wherein references to objects created in the manual heap are stored in an array in the thread-local state.

7. The method according to claim 6, wherein each thread has a local counter value stored in thread-local state and the method further comprises:
in response to determining that all of the local counter values are equal to the value of the global counter, incrementing the value of the global counter by one.

8. The method according to claim 7, wherein an object created in a manual heap by an owner thread has a single owning pointer to the object and the method further comprising:
in response to abandonment of the object by the owner thread, incrementing the local counter value of the owner thread by one.

9. The method according to claim 7, further comprising:
in response to determining that the local counter value of a thread is less than the value of the global counter, setting the local counter value of the thread to be equal to the value of the global counter.

10. The method according to claim 1, further comprising:
in response to detecting, by a first thread, that a second thread is preventing the global counter or a local counter of the first thread from being incremented, preventing the second thread from storing references to any objects in thread-local state by setting the array in the thread-local state for the second thread to read-only access.

11. The method according to claim 1, wherein an object created in a manual heap by an owner thread has a single owning pointer to the object and wherein each thread has a local counter value stored in thread-local state and in response to abandonment of the object by the owner thread, the method further comprises storing a current value of a local counter of each other thread in the delete queue with the identifier for the object and the current value of the local counter of the owner thread,
and wherein deallocation of the object is enabled only when all references to the object stored in thread-local state for any threads have been deleted and a current value of each local counter has incremented to a value that is at least a pre-defined amount more than the stored value for that local counter.

12. The method according to claim 11, further comprising:
in response to determining that all of the local counter values are equal, incrementing the value of at least one of the local counters by one.

13. The method according to claim 12, wherein an object created in a manual heap by an owner thread has a single owning pointer to the object and the method further comprising:
in response to abandonment of the object by the owner thread, incrementing the local counter value of the owner thread by one.

14. The method according to claim 12, further comprising:
in response to determining that the local counter value of a thread is less than the value of the local counters of all other threads, setting the local counter value of the thread to be equal to the value of the other local counters.

15. The method according to claim 11, wherein the pre-defined amount is equal to or greater than three.

16. A device comprising:
a processor;
memory arranged to store thread-local state for each of a plurality of threads; and
memory arranged to store device-executable instructions that when executed by the processor, cause the processor:
to enable one or more threads to access an object created in a manual heap by storing a reference to the object in thread-local state and subsequently deleting the stored reference after accessing the object; and
in response to abandonment of the object:
store an identifier for the object and a current value of a local counter of a thread or a global counter in a delete queue,
prevent any threads from storing any further references to the object in thread-local state, and
enable deallocation of the object only when all references to the object stored in thread-local state for any threads have been deleted and a current value of the local counter for the thread or the global counter has incremented to a value of three more than the stored value, wherein the global counter is updated using one or more local counters.

17. The device according to claim 16, wherein the device-executable instructions further comprise instructions that when executed by the processor, cause the processor to:
  detect, by a first thread of the plurality of threads, that a second thread of the plurality of threads is preventing the global counter or a local counter of the first thread from being incremented; and
  in response to detecting that the second thread is preventing the global counter or a local counter of the first thread from being incremented, prevent the second thread from storing references to any objects in thread-local state and exclude the second thread from any determination of whether to increment the global counter or the local counter of the first thread.

18. The device according to claim 17, wherein references to objects created in the manual heap are stored in an array in the thread-local state and wherein the device-executable instructions, when executed by the processor, prevent the second thread from storing references to any objects in thread-local state by:
  setting the array in the thread-local state for the second thread to read-only access; or
  setting a flag in the thread-local state for the second thread.

19. The device according to claim 16, wherein deallocation of the object is enabled only when all references to the object stored in thread-local state for any threads have been deleted and a current value of the global counter has incremented to a value that is at least a pre-defined amount more than the stored value.

20. The device according to claim 19, wherein each thread has a local counter value stored in thread-local state and the device-executable instructions further comprise instructions that when executed by the processor, cause the processor:
  in response to determining that all of the local counter values are equal to the value of the global counter, to increment the value of the global counter by one.

* * * * *